(12) United States Patent
Radke et al.

(10) Patent No.: US 7,584,812 B2
(45) Date of Patent: Sep. 8, 2009

(54) ARTICULATED DOZER WITH SUSPENSION AND SUSPENSION LOCKOUT

(75) Inventors: Daniel Dean Radke, Dubuque, IA (US); James Arthur Nagorcka, Tarrington (AU); Lyal Douglas Allen, Hamilton (AU)

(73) Assignee: Deere & Company, Moline, IL (US)

( * ) Notice: Subject to any disclaimer, the term of this patent is extended or adjusted under 35 U.S.C. 154(b) by 547 days.

(21) Appl. No.: 11/286,736

(22) Filed: Nov. 23, 2005

(65) Prior Publication Data
US 2006/0113120 A1    Jun. 1, 2006

Related U.S. Application Data

(60) Provisional application No. 60/631,542, filed on Nov. 29, 2004.

(51) Int. Cl.
 *B62D 55/116* (2006.01)
(52) U.S. Cl. ............... 180/9.54; 180/9.5; 280/124.161
(58) Field of Classification Search ............ 180/9.5, 180/9.44, 9.46, 9.52, 9.54, 9.1, 9.32; 280/6.159, 280/124.106, 124.161, 124.157
 See application file for complete search history.

(56) References Cited

U.S. PATENT DOCUMENTS

| 2,673,616 | A | * | 3/1954 | Moores | 180/237 |
| 3,063,510 | A | * | 11/1962 | Hunger et al. | 180/9.1 |
| 3,763,938 | A | | 10/1973 | Brodersen | 172/789 |
| 3,899,028 | A | | 8/1975 | Morris et al. | 172/4.5 |
| 3,907,041 | A | | 9/1975 | Manor | 172/780 |
| 3,974,699 | A | | 8/1976 | Morris et al. | 73/432 |
| 3,986,563 | A | | 10/1976 | Stubben | 172/793 |
| 4,053,017 | A | | 10/1977 | Gill et al. | 172/4.5 |
| 4,061,194 | A | | 12/1977 | McCanse | 172/447 |
| 4,088,236 | A | | 5/1978 | Moore | 214/90 |
| 4,124,080 | A | | 11/1978 | McCanse | 172/447 |
| 4,213,507 | A | | 7/1980 | Horrer et al. | 172/784 |
| 4,340,126 | A | | 7/1982 | Larson | 180/305 |
| 4,635,730 | A | | 1/1987 | Larsson | 172/788 |
| 4,696,350 | A | | 9/1987 | Ruhter et al. | 172/793 |
| 4,807,461 | A | | 2/1989 | Brimeyer et al. | 172/793 |
| 4,881,609 | A | * | 11/1989 | Purcell et al. | 180/9.5 |
| 5,015,009 | A | * | 5/1991 | Ohyama et al. | 280/5.52 |
| 5,074,061 | A | | 12/1991 | Thompson | 37/129 |
| 5,533,587 | A | * | 7/1996 | Dow et al. | 180/235 |
| 5,549,412 | A | | 8/1996 | Malone | 404/84.1 |
| 5,632,350 | A | * | 5/1997 | Gauvin | 180/9.44 |
| 5,762,446 | A | | 6/1998 | Manatt et al. | 404/75 |
| 5,775,438 | A | | 7/1998 | Confoey et al. | 172/831 |
| 5,921,706 | A | | 7/1999 | Manatt et al. | 404/72 |
| 6,164,399 | A | * | 12/2000 | Bays | 180/9.5 |

(Continued)

*Primary Examiner*—Anne Marie M. Boehler

(57) ABSTRACT

An articulated loader has an articulated chassis and two A-frames. The points of the A-frames face each other. The articulated chassis includes a front portion and a rear portion. Likewise, there is a front or first A-frame and a rear or second A-frame. The A-frames are connected to the overall chassis at points close to but offset from the point of vehicle articulation via ball joints and via hydraulic suspension cylinders toward the wider portions of the "A"s. The vehicle is propelled along the ground by tracks that are independently suspended. The invention includes a suspension lockout feature to, effectively lockout the suspension system, i.e., render it rigid. One or more valves may are used to prevent hydraulic flow from and two the hydraulic suspension cylinders.

15 Claims, 5 Drawing Sheets

U.S. PATENT DOCUMENTS

| | | | |
|---|---|---|---|
| 6,209,669 B1 * | 4/2001 | Young | 180/9.52 |
| 6,322,287 B1 | 11/2001 | Yelton | 404/118 |
| 6,382,873 B1 | 5/2002 | Mulders et al. | 404/128 |
| 6,691,795 B2 | 2/2004 | L'Abbe | 172/787 |
| 2002/0162669 A1 | 11/2002 | L'abbe | 172/787 |

* cited by examiner

ARTICULATED DOZER WITH SUSPENSION AND SUSPENSION LOCKOUT

This document claims priority based on U.S. provisional; application Ser. No. 60/631,542, filed Nov. 29, 2004, and entitled ARTICULATED DOZER WITH SUSPENSION AND SUSPENSION LOCKOUT, under 35 U.S.C. 119(e).

FIELD OF THE INVENTION

This applies to an articulated crawler dozer. Specifically, it applies to articulated crawler dozer with four independent tracks and a suspension system. In this configuration, the tracks are mounted such that they can move in a way that they can follow the contour of the ground.

BACKGROUND OF THE INVENTION

Conventional construction vehicles (dozers, loaders, backhoes, skid steers, graders, etc) do not have cushioning suspension systems but are, at most, equipped with pneumatic tires. The consequence is that the machine ride can be very harsh dependant upon the operating conditions of the machine. Presented herein is an articulated dozer with an independent suspension system that reduces the harshness of the ride.

Agricultural tractors are increasingly incorporating suspension systems to reduce the shock to the vehicle and thus increasing the operational speed of the vehicle.

Traditionally, blade equipped construction vehicles such as crawlers or graders are structurally rigid. Such rigidity is desirable in that the blade does not move vertically in response to changing soil conditions. The cutting edge is typically angled back at the top so that it will shave off the material when elevated material is contacted. A consequence of this characteristic is that a vertical force is generated on the blade cutting edge when hard soil conditions are encountered. If the machine is not sufficiently rigid, the blade will lower and dig into the ground under these conditions. When soft soil is encountered and the vertical force reduced, the blade will tend to rise to a higher elevation. An analogy can be made to a plane that is used in woodworking. The tool shaves off high regions without gouging, and moves over low regions without any affect to the material. Suspension tends to reduce vehicle rigidity and may allow the blade to move up or down based on the load encountered from the contours of the ground. Thus, the addition of suspension to such a construction vehicle creates a situation that is counter to the desired performance indicated above, i.e., smooth and consistent blade movement regardless of the soil condition.

SUMMARY OF THE INVENTION

An exemplary articulated vehicle using the invention includes a front lower A-frame and a rear lower A-frame as well as an articulated chassis having a front portion and a rear portion. The front and rear A-frames are pivotally attached to the articulated chassis via ball joints, the point of attachment for the front lower frame being forward of the chassis articulation joint and the point of attachment for the rear lower frame being rearward of the chassis articulation joint. Relative lateral movement between the lower A-frames and the portions of the articulated chassis to which they are attached are constrained due to pan hard rod connections between the A-frames and the articulated chassis at each end of the articulated chassis. Toward each end of the chassis two suspension cylinders situated between the chassis and each A-frame support the articulated chassis above the A-frames allowing relative vertical movements between the A-frames and the chassis.

Naturally, such a suspension system will tend to allow variations in the height of the blade above the ground as the blade encounters greater and lesser resistance resulting in varying vertical loads on the blade and the suspended chassis of the vehicle. The suspension height of the chassis will tend to vary with the vertical load generated causing undesirable results with respect to blade control.

An exemplary embodiment of the invention provides a hydraulic circuit that allows an operator of the vehicle to restrict or prevent hydraulic fluid flow to and from each of the suspension cylinders, thus locking the suspension cylinders in both functional directions.

BRIEF DESCRIPTION OF THE DRAWINGS

Embodiments of the invention will be described in detail, with references to the following figures, wherein.

DESCRIPTION OF THE ILLUSTRATED EMBODIMENT

The exemplary embodiment of the invention described herein is applied to a crawler dozer with four independent tracks. In this configuration, the tracks are mounted such that they can move in a way that they can follow the contour of the ground. Each of the tracks pivots about a drive wheel.

Figure 1:
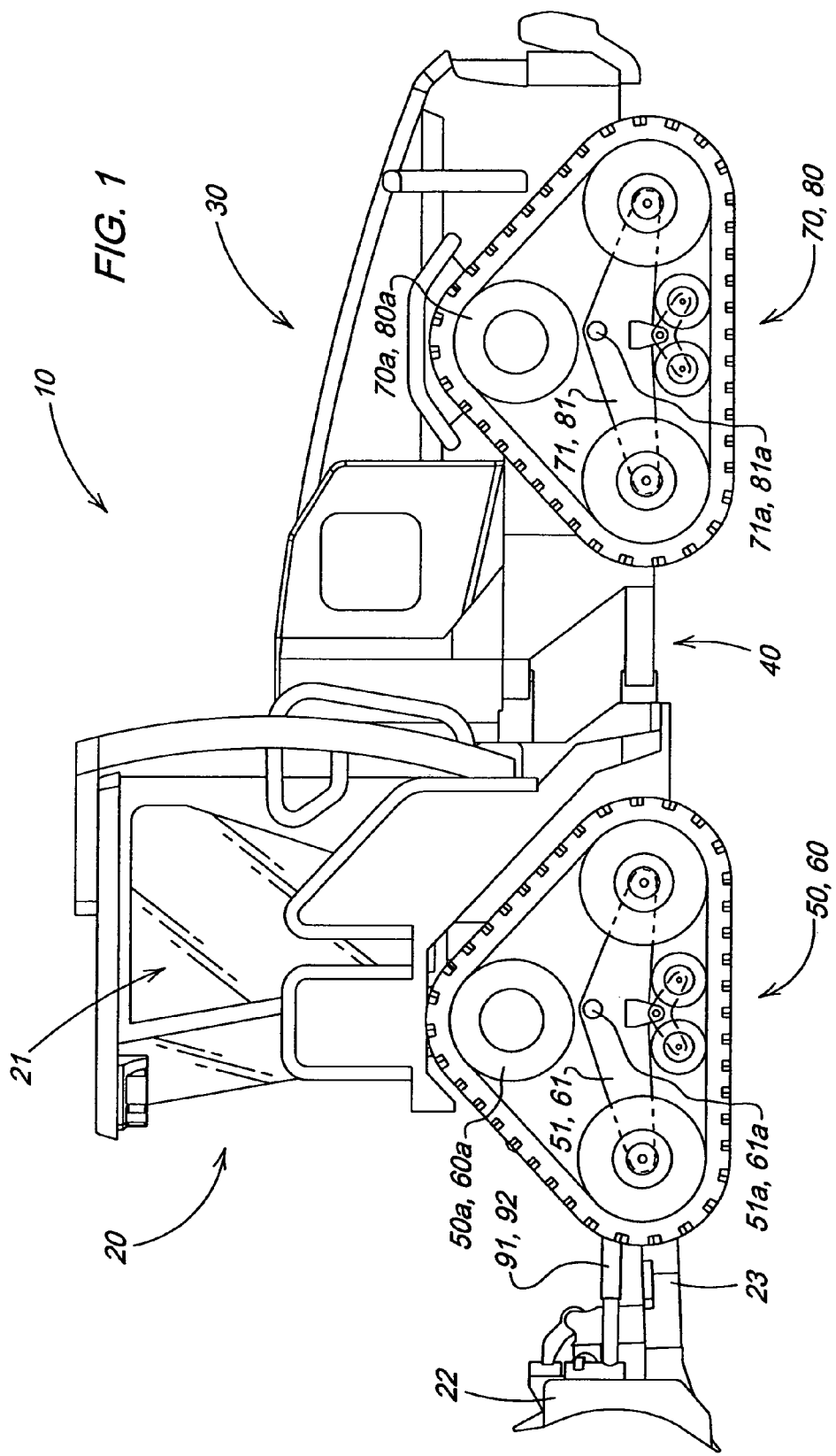
FIG. 1 is a side view of a work vehicle in which the invention may be used.

FIG. 1 illustrates a vehicle in which the invention may be used. The particular vehicle illustrated in FIG. 1 is a four track articulated dozer 10 having a front portion 20 a rear portion 30; an articulation mechanism 40 between the front portion 20 and the rear portion 30; first track systems 50, 60; and second track systems 70, 80. The front portion 20 includes a blade 22 and a blade mounting frame 23 as well as an operator cab 21.

Figure 3:
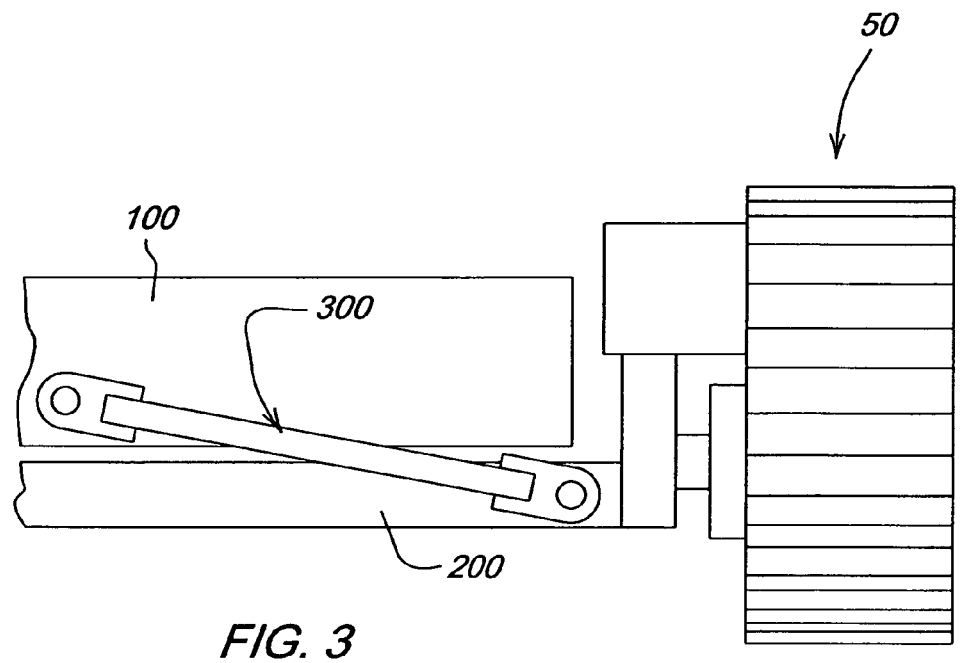
FIG. 3 is a front view of a front portion of the chassis and a first A-frame connected by a pan hard rod.

An A-frame structure or a first A-frame 200 that is pivotally connected to both the first and second track frames or rocker arms 51, 61 at pivots 51a, 61a. The first A-frame 200 is connected to the vehicle front frame, i.e., front chassis portion 100 primarily at the top of the "A" with a first spherical ball joint 101. The first spherical ball joint 101 is located in proximity to but forward of the articulation joint 40. Laterally the first A-frame 200 is connected to the vehicle frame with a first linkage (first pan-hard rod) 300 (see FIG. 3) to keep the position of the first A-frame 200 approximately centered under the front chassis portion 100, restricting relative lateral motion. The front chassis portion 100 is vertically connected to the first A-frame 200 by a first suspension cylinder 231 having a first cylinder head end 231a and a first cylinder rod end 231*b*; and a second suspension cylinder 232 having a second cylinder head end 232*a* and a second cylinder rod end 232*b*. The first and second suspension cylinders 231 and 232 are attached to first and second control valves 231*d* and 232*d*, respectively, and first and second hydraulic accumulators 250*a* and 250*b*, respectively. A mechanism senses the position of the first A-frame 200 relative to the front chassis portion 100 at each cylinder location, and controls the vehicle height by adding or removing hydraulic fluid from the cylinder system on a continuous basis through via first balancing circuit 240. These cylinders 231 and 232 primarily support a front portion of the vehicle weight.

It is also desired to control vehicle roll position at this front axle 203. To accomplish this, the first cylinder head end 231*a* is hydraulically connected to the second cylinder rod end 232*b*. Conversely the second cylinder head end 232*a* is hydraulically connected to the first cylinder rod end 231*b* of the first cylinder 231. This methodology reduces the effective cylinder area to be equal to the rod area of the cylinder. This creates a higher pressure in the system which is desirous for improved suspension control.

Figure 2:
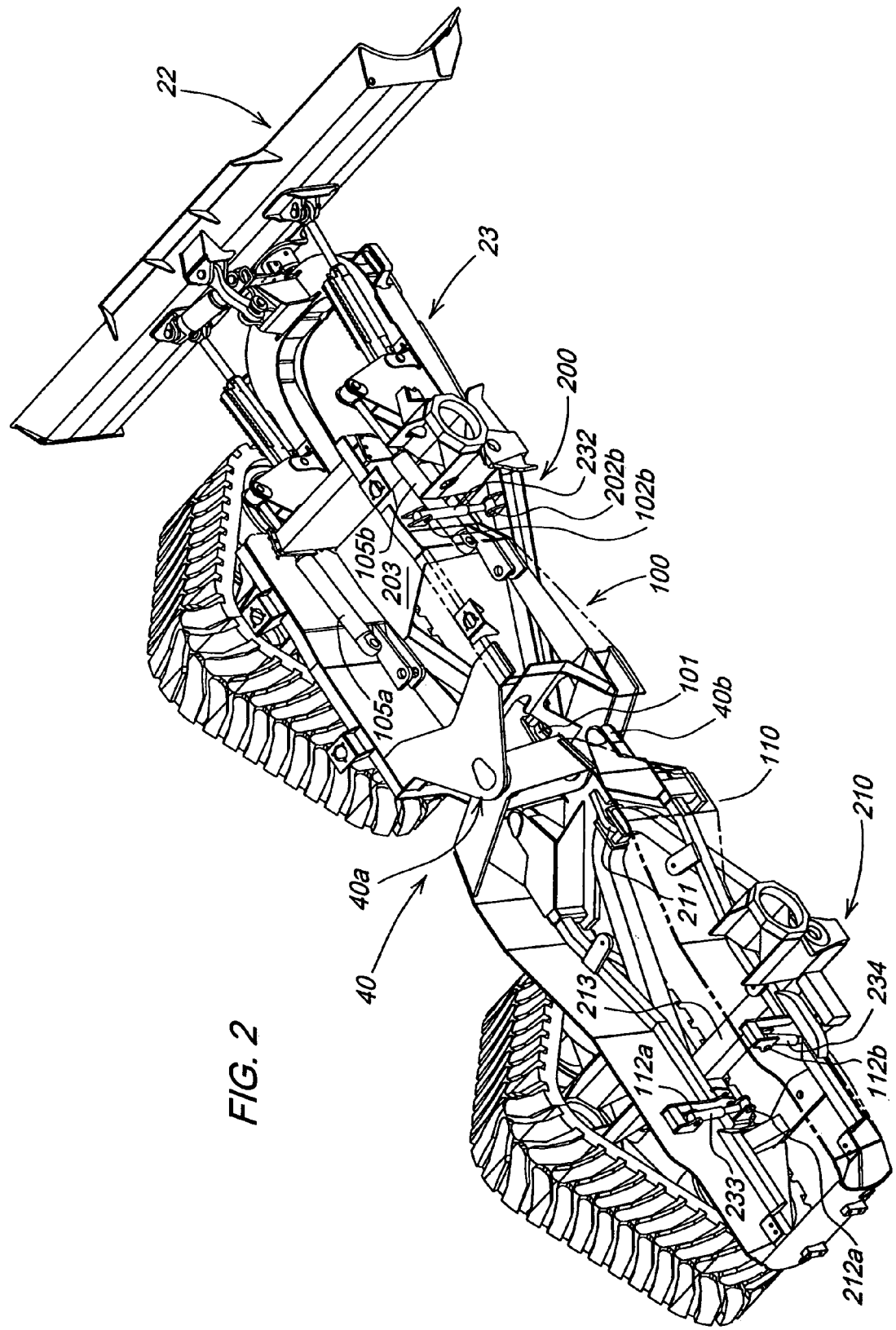
FIG. 2 is an elevated oblique view of an articulated chassis, two A-frames and C-frame of the vehicle illustrated in FIG. 1.

As illustrated in FIG. 2, the cylinders 231, 232 are attached to the first A-frame 200 at a point behind the track frame pivots 51*a*, 61*a* so that they operate at an increased pressure level. This helps contribute to the roll stability mentioned above by increasing the pressure proportionally.

Figure 4:
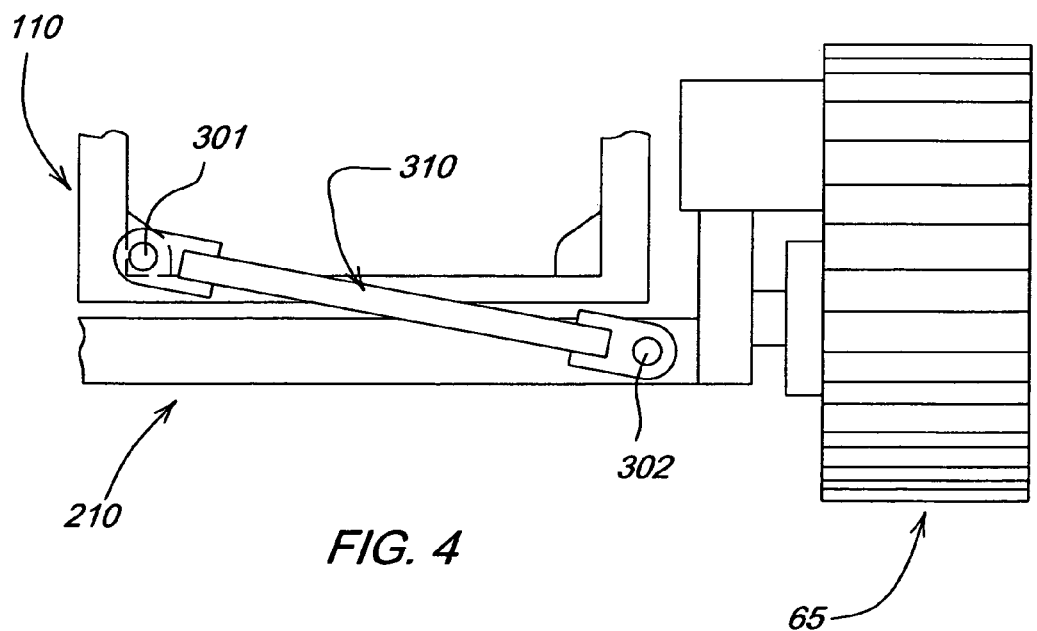
FIG. 4 is a rear view of a rear portion of the chassis and a second A-frame connected by a pan hard rod.
Figure 5:
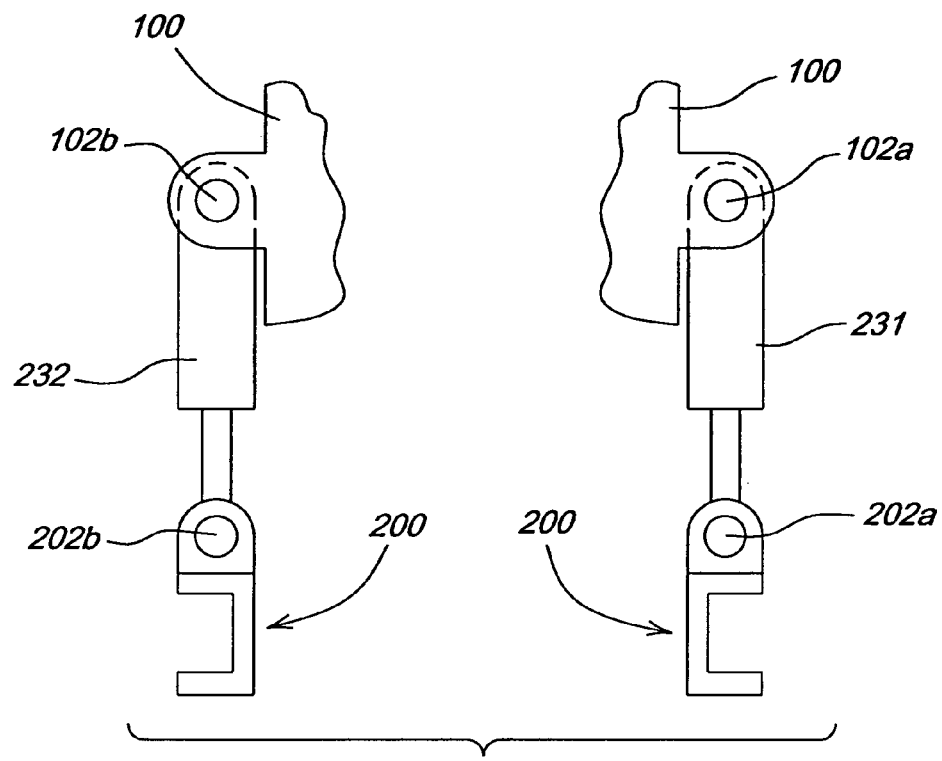
FIG. 5 is a front view of the front portion of the chassis and the first A-frame connected by two suspension cylinders.

A second A-frame structure 210 is pivotally connected to both the third and fourth track frames, i.e., rocker arms 71, 81 at pivots 71*a*, 81*a*. This A-frame 210 is connected to the vehicle rear frame, i.e., rear chassis portion 210 primarily at the top of the "A" with a spherical ball joint 211 as illustrated in FIG. 2. This point is located to the rear of the articulation joint 40. Laterally the second A-frame 210 is connected to the rear chassis portion 110 with a linkage (pan-hard rod) 310 to the second A-frame 210 approximately centered under the rear chassis portion 110 as illustrated in FIG. 4. The rear chassis portion 110 is vertically connected to the second A-frame 210 by a third hydraulic suspension cylinder 233 having a third cylinder head end 233*a* and a third cylinder rod end 233*b*; and a fourth hydraulic suspension cylinder 234 having a fourth cylinder head end 234*a* and a fourth cylinder rod end 234*b*. These cylinders 233, 234 are hydraulically connected together and are attached to third and fourth control valves 233*d*, 234*d* and third and fourth hydraulic accumulators 251*a*, 251*b*. A mechanism senses the position of the A-frame relative to the vehicle frame at a point midway between the cylinders indicating the average location, and controls the vehicle height by adding or removing hydraulic fluid from the cylinder system on a continuous basis via second balancing circuit 241.

It is desired to have the rear axle oscillate to ensure all 4 tracks maintain ground contact at all times. This is done by connecting the head end of the third and fourth cylinders 233, 234 together to allow oil to flow from one to the other as needed. The rod ends of the left and right cylinders are also connected together likewise. Thus, the third and fourth cylinder head ends 233*a*, 234*a* are hydraulically connected and the third and fourth cylinder rod ends 233*b*, 234*b* are hydraulically connected (see FIG. 7).

Figure 6:
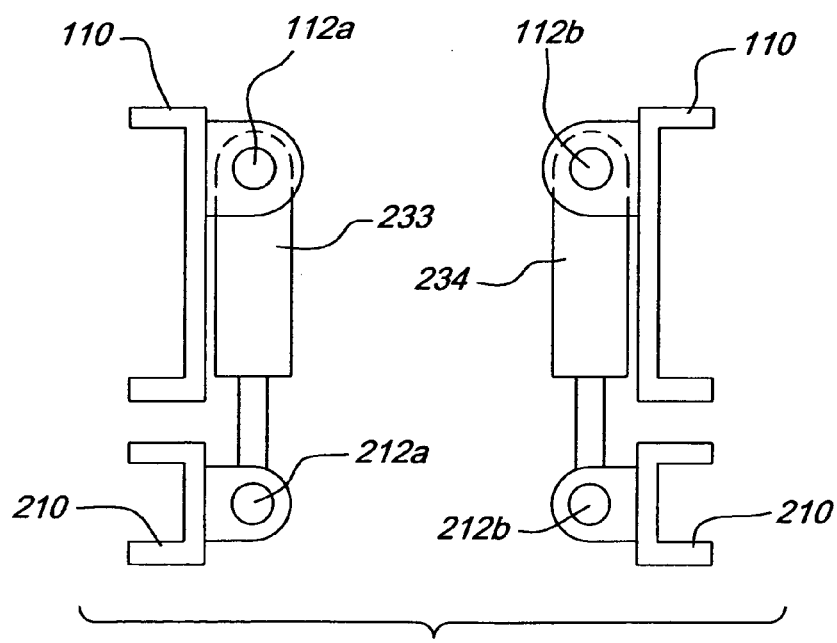
FIG. 6 is a rear view of a rear portion of the chassis and a second A-frame connected by two suspension cylinders.

As illustrated in FIG. 2, the third and fourth cylinders 233, 234 are attached to the second A-frame 210 at a point behind the third and fourth track frames, i.e., rocker arm pivots 71, 81 so that they operate at a reduced pressure level. This lowers the pressure of the system for a smoother ride. In the exemplary embodiment illustrated in FIGS. 2 and 6, the third hydraulic suspension cylinder 233 is connected to the rear chassis 110 at pivot 112*a* and to the second A-frame 210 at pivot 212*a*. Similarly, the fourth hydraulic suspension cylinder 234 is connected to the rear chassis 110 and the second A-frame at pivots 112*b* and 212*b* respectively. This lowers the pressure of the system for a smoother ride.

The first and second balancing circuits 240, 241 are hydraulic circuits that maintain the nominal distances between the front chassis portion 100 and the front A-frame 200 and the rear chassis portion 110 and the rear A-frame 210. The centering circuits include at least a pump line A to a hydraulic pump, a load sense line B to the same pump and a line to tank C.

The blade mounting structure, referred to as the C-frame 23, is operatively attached to the first A-frame 200. This ensures the blade level (right to left with respect to the operator) will be consistent with the tracks and relatively unaffected by vehicle chassis motion enabled by the suspension system motion.

Figure 7:
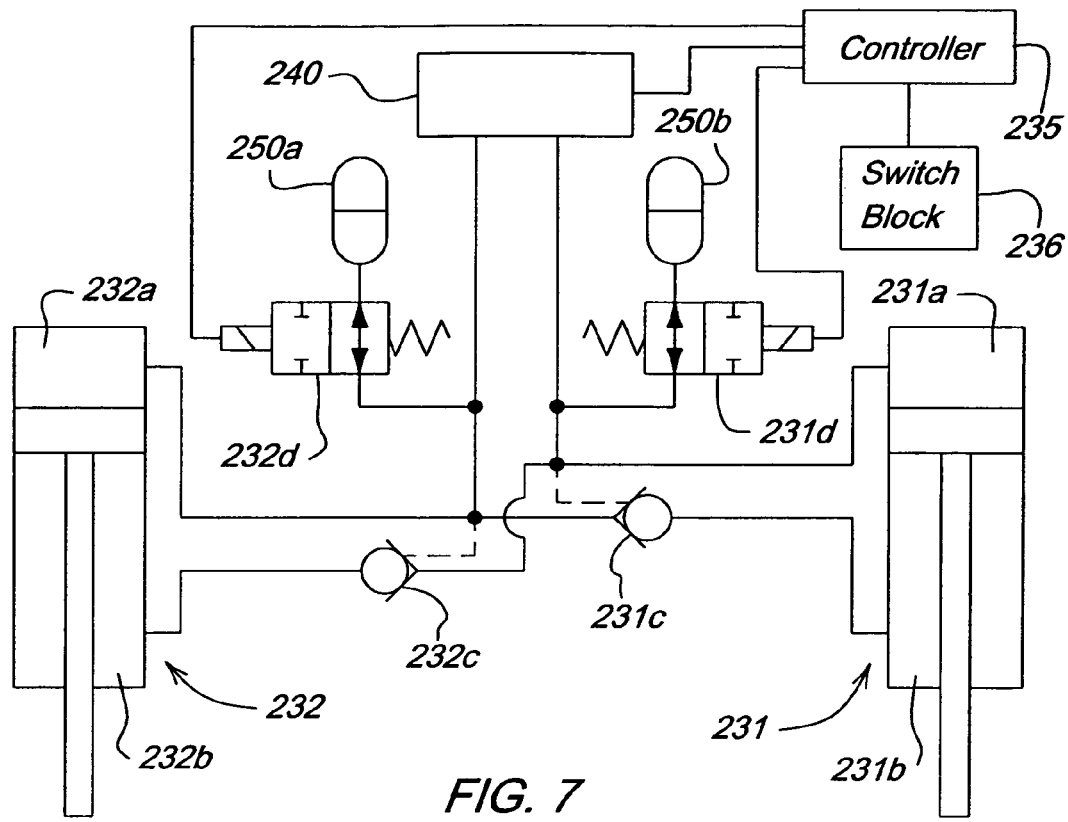
FIG. 7 is an exemplary schematic of the cylinders illustrated in FIG. 5.

A suspension elimination mechanism is also embodied in the design which enables the operator to lock the suspension system. This could be beneficial if very precise blade control is desired. The operator controls enable the front and/or rear axles to be locked or enabled independently from the operator station. This is accomplished by incorporating lock valves 231*d*, 232*d* in the front suspension cylinder circuit. These valves eliminate oil flow in or out of each front accumulators 250*a*, 250*b* individually thus locking out front suspension cushioning. FIG. 7 illustrates an exemplary embodiment of the invention showing this feature. As illustrated in FIG. 7 electrohydraulic valves 231*d* and 232*d* are normally open. However, when the controller 235 receives a signal from the switch block 236, the controller 235 sends signals to each of the electrohydraulic valves 231*d*, 232*d* to move from position 1 to position 2 and, thus close all lines, preventing the flow of hydraulic fluid from or to each of the first and second accumulators 250*a*, 250*b* and, in effect, locking out the cushioning effect from the accumulators. This, in effect, produces a rigid suspension which resists all variations in height at the front of the vehicle 10 and gives more precise blade control to the operator. Hydraulic flow may still occur between balancing circuit 240 and the first and second suspension cylinders 231, 232 and between the suspension cylinders 231, 232.

Figure 8:
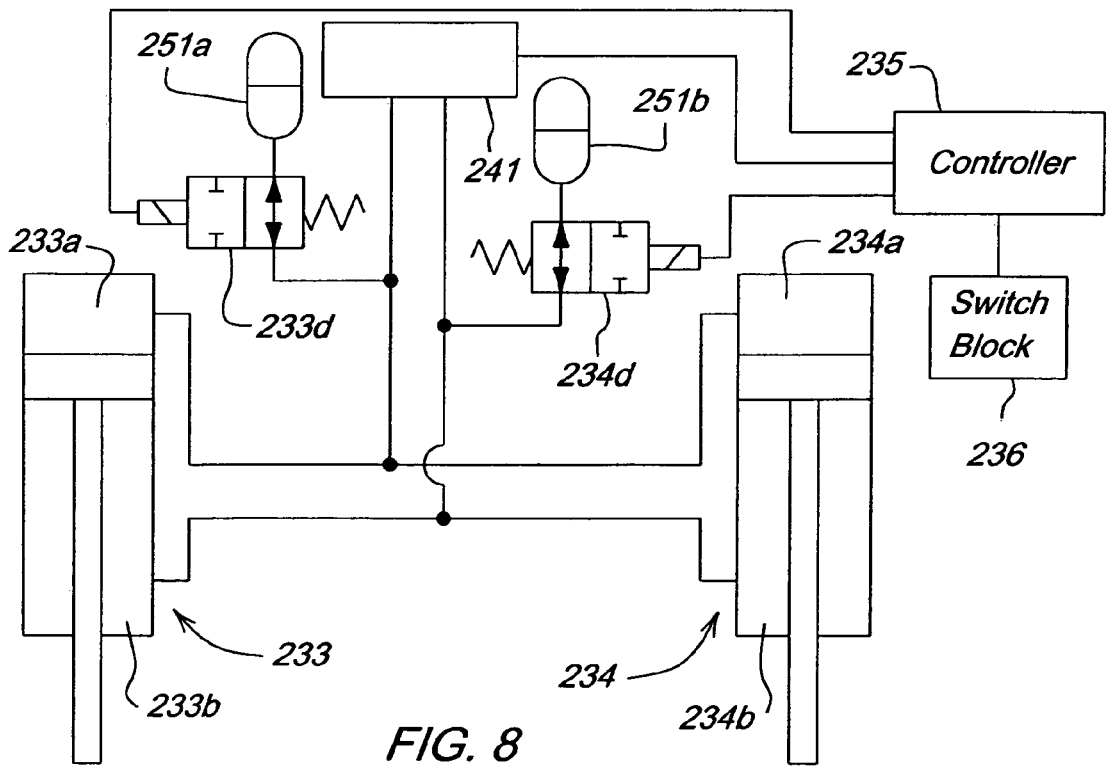
FIG. 8 is an exemplary schematic of the cylinders illustrated in FIG. 6.

An independent lock system is also integrated in the rear suspension system. This system is unique from the front lock system in that it maintains a connection to allow fluid transfer between the right and left cylinder to provide axle oscillation. No fluid is allowed to enter or escape from the cylinder pair when the lock is enabled. As illustrated in FIG. 8, upon receiving a signal from the switch block 236, the controller 235 signals the third and fourth electrohydraulic valves 233*d*, 234*d* to move from positions 1 to positions 2, effectively stopping flow from and to rear the third and fourth accumulators 251*a*, 251*b*. Hydraulic flow may still occur between the third suspension cylinder 233 and the fourth suspension cylinder 234 as well as between the second balancing circuit 241 and the suspension cylinders. This arrangement allows for a better, more stable ride but resists changes in vehicle height due to blade loads.

Having described the illustrated embodiment, it will become apparent that various modifications can be made without departing from the scope of the invention as defined in the accompanying claims.

The invention claimed is:

1. An articulated dozer, comprising:
    a front chassis portion;
    an articulation joint;
    a rear chassis portion connected to the front chassis portion via the articulation joint;

a first A-frame;
a second A-frame, a length of the second A-frame frame being approximately equal to a length of the first A-frame frame, the front chassis portion and the rear chassis portion, respectively suspended above the first and second A-frames;
a first ball joint;
a second ball joint, a narrow portion of the first A-frame connected to the front chassis portion via the first ball joint, a narrow portion of the second A-frame connected to the rear chassis via the second ball joint, the first ball joint and the second ball joint in proximity to the articulation joint;
at least one accumulator;
a first suspension cylinder operatively attached to the front chassis portion and the first A-frame;
a second suspension cylinder operatively attached to the front chassis portion and the first A-frame; and
at least one valve, the at least one valve capable of stopping hydraulic flow from and to the at least one accumulator, the first and second suspension cylinders hydraulically connected to the at least one accumulator via the at least one valve.

2. The articulated dozer of claim 1, further comprising:
a third suspension cylinder operatively attached to the rear chassis portion and the second A-frame;
a fourth suspension cylinder operatively attached to the rear chassis portion and the second A-frame;
at least one other accumulator; and
at least one other valve, the at least one other hydraulic valve capable of stopping hydraulic from and to the at least one other accumulator, the third and fourth suspension cylinders hydraulically connected to the at least one other accumulator via the at least one other valve.

3. The articulated dozer of claim 1, wherein;
the at least one valve comprises a first valve and a second valve;
the at least one accumulator comprises a first accumulator and a second accumulator, the first and second suspension cylinders hydraulically connected to the first and second accumulators, respectively, via the first and second valves respectively.

4. The articulated dozer of claim 2, wherein:
the at least one other valve comprises a third valve and a fourth valve;
the at least one accumulator comprises a third accumulator and a fourth accumulator, the third and fourth suspension cylinders hydraulically connected to the third and fourth accumulators, respectively, via the third and fourth valves respectively.

5. The articulate dozer of claim 3, wherein the first and second accumulators provide a cushioning effect for the first and second suspension cylinders when the first and second valves are first position.

6. The articulated dozer of claim 4, wherein the third and fourth accumulators provide a cushioning effect for the third and fourth suspension cylinders when the third and fourth valves are in a first position.

7. The articulated dozer of claim 5, wherein the cushioning effect is locked out when the first and second valves are in a second position.

8. The articulated dozer of claim 6, wherein the cushioning effect is locked out when the third and fourth valves are in a second position.

9. The articulated dozer of claim 1, further comprising a at least one track system.

10. The articulated dozer of claim 9, wherein the at least one track system comprises a first track system, a second track system, a third track system and a fourth track system.

11. The articulated dozer of claim 10, wherein the first and second track systems are pivotally attached to first and second sides of a wider portion of the first A-frame.

12. A dozer, comprising:
a chassis portion;
an A-frame, the A-frame capable of motion relative to the chassis portion;
a first track system;
a second track system;
at least one accumulator;
a first suspension cylinder operatively attached to a first part of the chassis portion and a first part of the A-frame, the first track system attached to the A-frame in proximity to the first suspension cylinder;
a second suspension cylinder operatively attached to a second part of the chassis portion and a second part of the A-frame, the second track system attached to the A-frame in proximity to the second suspension cylinder; and
at least one valve, the at least one valve capable of stopping hydraulic flow from and to the at least one accumulator, the first and second suspension cylinders hydraulically connected to the at least one accumulator via the at least one valve.

13. The dozer of claim 12, wherein the at least one accumulator provides a cushioning effect for the first and second suspension cylinders when the first and second valves are in a first position.

14. The dozer of claim 12, wherein the cushioning effect is locked out when the first and second valves are in a second position.

15. The dozer of claim 12, further comprising a hydraulic line allowing hydraulic flow between the first hydraulic cylinder and the second hydraulic cylinder.

* * * * *